(12) United States Patent
LePort

(10) Patent No.: US 8,867,180 B2
(45) Date of Patent: Oct. 21, 2014

(54) DYNAMIC CURRENT PROTECTION IN ENERGY DISTRIBUTION SYSTEMS

(71) Applicant: Tesla Motors, Inc., Palo Alto, CA (US)

(72) Inventor: Francisco LePort, San Francisco, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 38 days.

(21) Appl. No.: 13/691,563

(22) Filed: Nov. 30, 2012

(65) Prior Publication Data
US 2014/0153150 A1 Jun. 5, 2014

(51) Int. Cl.
H02H 3/00 (2006.01)
H02H 3/08 (2006.01)

(52) U.S. Cl.
CPC ........................................ H02H 3/08 (2013.01)
USPC ................................................. 361/23; 361/8

(58) Field of Classification Search
USPC ............................................... 361/93.7–93.9
See application file for complete search history.

(56) References Cited

U.S. PATENT DOCUMENTS 6,490,141 B2 * 12/2002 Fischer et al. .................. 361/66
7,773,360 B2 8/2010 O'Leary et al.
2003/0107863 A1 6/2003 Kelwaski
2005/0078419 A1 4/2005 Stockinger et al.
2011/0170223 A1 * 7/2011 DiMarco et al. ................ 361/94
2012/0134060 A1 5/2012 Bode et al.
2013/0169038 A1 * 7/2013 King ............................ 307/10.1

FOREIGN PATENT DOCUMENTS

JP    2008-502300 A    1/2008

OTHER PUBLICATIONS

International Application No. PCT/US2010/072091, International Search Report, Mar. 17, 2014, 3 pages.

* cited by examiner

Primary Examiner — Danny Nguyen
(74) Attorney, Agent, or Firm — J. Richard Soderberg

(57) ABSTRACT

An electric circuit, including an electric load operable from an operating current; an energy storage system providing the operating current at both a first mode and a second mode with the first mode having a first current in a first range of zero to a first particular current value and with the second mode having a second current in a second range of the first particular current value to a second particular current value; and an active protection coupled to the energy storage system, the active protection dynamically reconfigurable between a first mode and a second mode, the first mode applying a first overcurrent protection rating to the operating current when the operating current is operating in the first mode and the second mode applying a second overcurrent protection rating to the operating current when the operating current is operating in the second mode.

14 Claims, 2 Drawing Sheets

DYNAMIC CURRENT PROTECTION IN ENERGY DISTRIBUTION SYSTEMS

FIELD OF THE INVENTION

The present invention relates generally to current protection in high-voltage distribution systems, and more specifically, but not exclusively, to dynamic current protection in high-voltage battery packs for electric vehicles.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

High energy distribution from rechargeable energy storage systems such as high-voltage battery packs used in electric vehicles (EVs) operate at hazardous voltages and currents during normal operation. It is common to provide overcurrent protection devices such as fuses to limit hazards associated with overcurrent from short circuit currents.

Normal operation for applications such as the EV includes a wide range of current requirements. Setting overcurrent protection devices to protect for maximum current requirements can create unprotected situations in which potentially hazardous short circuit currents are within the normal operating range for more typical current requirements. Setting overcurrent protection devices to protect for overcurrent short circuits at the more typical current requirements risks limiting performance or triggering the overcurrent protection mechanism during high performance use of the EV.

What is needed is a system and method for increasing a range of effective overcurrent protection for differing usage profiles.

BRIEF SUMMARY OF THE INVENTION

Disclosed is a system and method for increasing and controlling a range of effective overcurrent protection for differing usage profiles.

The following summary of the invention is provided to facilitate an understanding of some of technical features related to active overcurrent protection for variable high-energy distribution, and is not intended to be a full description of the present invention. A full appreciation of the various aspects of the invention can be gained by taking the entire specification, claims, drawings, and abstract as a whole. The present invention is applicable to other implementations in addition to the electric vehicle including grid connected systems and implementations where there are normal levels of operating current and/or transient peak levels of operating current.

An electric circuit, including an electric load operable from an operating current; an energy distribution system providing the operating current at both a first mode and a second mode with the first mode having a first current in a first range of zero to a first particular current value and with the second mode having a second current in a second range of the first particular current value to a second particular current value; and an active protection coupled to the energy distribution system, the active protection dynamically reconfigurable between a first mode and a second mode, the first mode applying a first overcurrent protection rating to the operating current when the operating current is operating in the first mode and the second mode applying a second overcurrent protection rating to the operating current when the operating current is operating in the second mode.

A method for operating an electric circuit, including a) transferring an operating current from an energy distribution system to a load; and b) applying dynamically a particular one overcurrent protection rating from a plurality of predetermined selectable overcurrent protection ratings to the operating current responsive to a current amplitude of the operating current.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Embodiments of the present invention provide a system and method for controlling a range of effective overcurrent protection for differing usage profiles. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
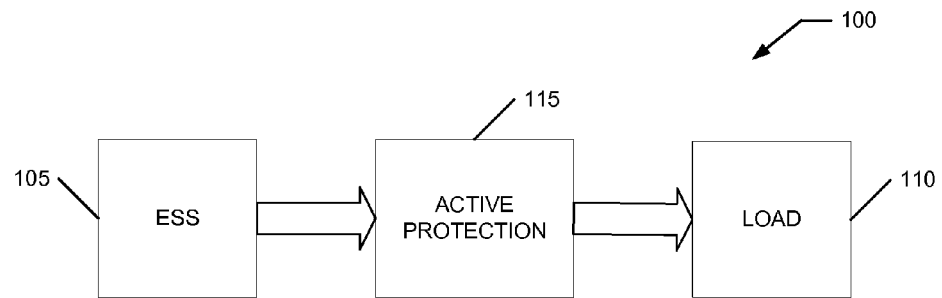
FIG. 1 illustrates an overview of an electric system.

FIG. 1 illustrates an overview of an electric system 100. System 100 may be used in a mobile environment like an electric vehicle or other device having an electric-energy-powered component of a propulsion system. System 100 is characterized in that there are extended periods of a first rate of energy dissipation and less frequent periods of a second rate of energy dissipation greater than the first rate. In a user-controlled mobile environment, there is randomness associated with the distribution of these different rates and the duration of each period. Some embodiments may have more predictability in either or both of these categories and still embody the present invention.

Electric system 100 includes an energy storage system 105 providing power to a load 110. Energy storage system 105 is an assembly of hundreds-to-thousands of parallel and series-connected energy storage elements that collectively produce high-voltage and high-current to load 110. These energy storage elements may be battery cells, ultracapacitors, or the like that produce hundreds of volts and many tens, hundreds, or thousands of kWh of energy from nominal 4 volt, 2500 mAh elements.

Load 110 includes a range of devices, including electric propulsion motors, and other dissipative assemblies operating at high-voltage and/or high-current. The energy dissipation profile for load 110 can be highly variable but often includes extended periods of relatively low power consumption (normal operation) punctuated with brief periods of relatively high (e.g., maximum) power consumption (peak operation). For example, a high-power piece of machinery may operate connected to the an energy distribution system (e.g., electric grid) 480V and use 50 A normally, but require peak currents of 300 A for just a few seconds during initialization or other operations Overcurrent protection is often implicated in systems of the type represented generally by energy system 100. Overcurrent is the condition where current from energy storage system 105 is greater than the rated current of load 110 and can be the result of an overload, short circuit, or ground fault. As the energy, voltages, and currents increase, it becomes increasingly important to provide proper overcurrent protection. With high-voltage energy storage system 105, when a user commands any particular power dissipation rate, there is a possibility of degradation or compromise that can produce unintended high-energy transfers to load 110. A conventional system includes a single fusing device interposed between a battery pack and a propulsion motor to protect against just such an occurrence.

As a difference between energy transfer rates of the normal operation and peak operation become greater, it is increasingly problematic to rely on a single fuse for the reasons identified herein. Setting the fuse to protect the load based upon the peak operation current increases risks that the system will not be protected from an overcurrent during normal operation. Similarly, setting the fuse to protect the load based upon the normal operation current increases risks that the currents during peak operation will trigger the fuse.

Electric system 100 uses an active protection 115 to protect load 110 across a broad range of currents. Active protection 115 is active in the sense that it dynamically configures itself to a usage profile to selectively enable a proper level of overcurrent protection at various operational regions (e.g., for both a normal operation and a peak operation). Active protection 115 is not required to be a separate assembly but may be integrated into energy storage system 105 and/or load 110 or other system depending upon implementation.

Figure 2:
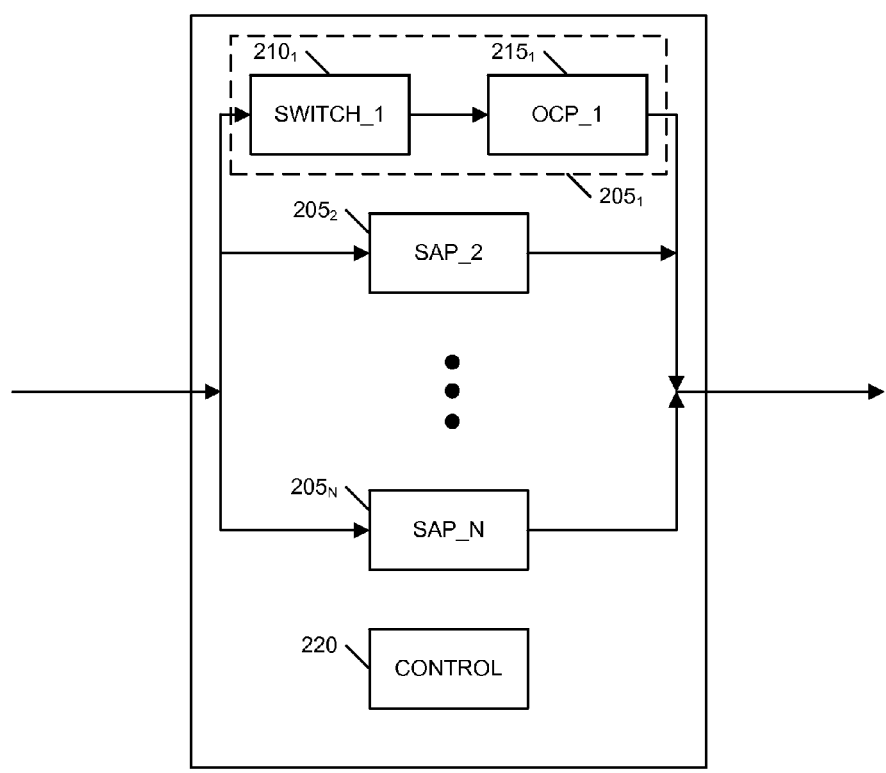
FIG. 2 illustrates a functional diagram of an active protection system used in the electric system of FIG. 1.

FIG. 2 illustrates a functional diagram of active protection 115 used in the electric system 100. Active protection 115 of FIG. 2 includes a plurality of parallel selective active protection (SAP) 205 elements. Each selective active protection 205 element includes a switch 210 in series with an overcurrent protector 215. The number of selective active protection elements 205 depends upon the number of different standard operational modes are to be independently protected. For the example defining normal operation and peak operation, N=2 for active protection 115. Other implementations may have N equal to other values.

Switches 210 may be used to control relatively large energy currents and active protection 115 is expected to dynamically reconfigure itself often. Therefore switch 210 may be implemented as a high-voltage contactor, relay or the like. Overcurrent protector 215 is a device or assembly that protects against overcurrent, such as a fuse, relay, breaker, or other current interruption device, though some embodiments may include current limiters or other device suitable for the implementation of overcurrent protection.

Characteristics of overcurrent protector 215 used in the illustrated embodiments is that it allows a rated amount of current (with margin percent overcurrent accepted), and that it allows excessive current for short periods (with that period typically being inversely related to the percent overcurrent).

Active protection 115 includes a control function 220 that controls each switch 210x. Control function 220 receives information about operating mode changes and uses that information to reconfigure selective active protection 205 elements. Switches 210 will be enabled or disabled appropriately to provide the desired overcurrent protection. Control function 220 may receive operating mode commanded or predictive information from other systems, such as a throttle control, navigation system, battery management system, or other system that receives information about actual commanded current or anticipated upcoming commanded current from energy storage system 105.

The operating environment for electric system 100 typically includes one or more cooling systems, especially for high voltage and high current implementations. Selective active protection 205, particularly switches 210, may get hot due to the power they distribute. The cooling system may be extended to each selective active protection 205 to address any risks associated with heating them. Control function 220 may monitor the temperature of the switches and/or the overcurrent protection devices to report a thermal profile, excessive temperature, and/or to initiate a response to excessive temperature including activating/increasing coolant or limiting maximum current.

Figure 3:
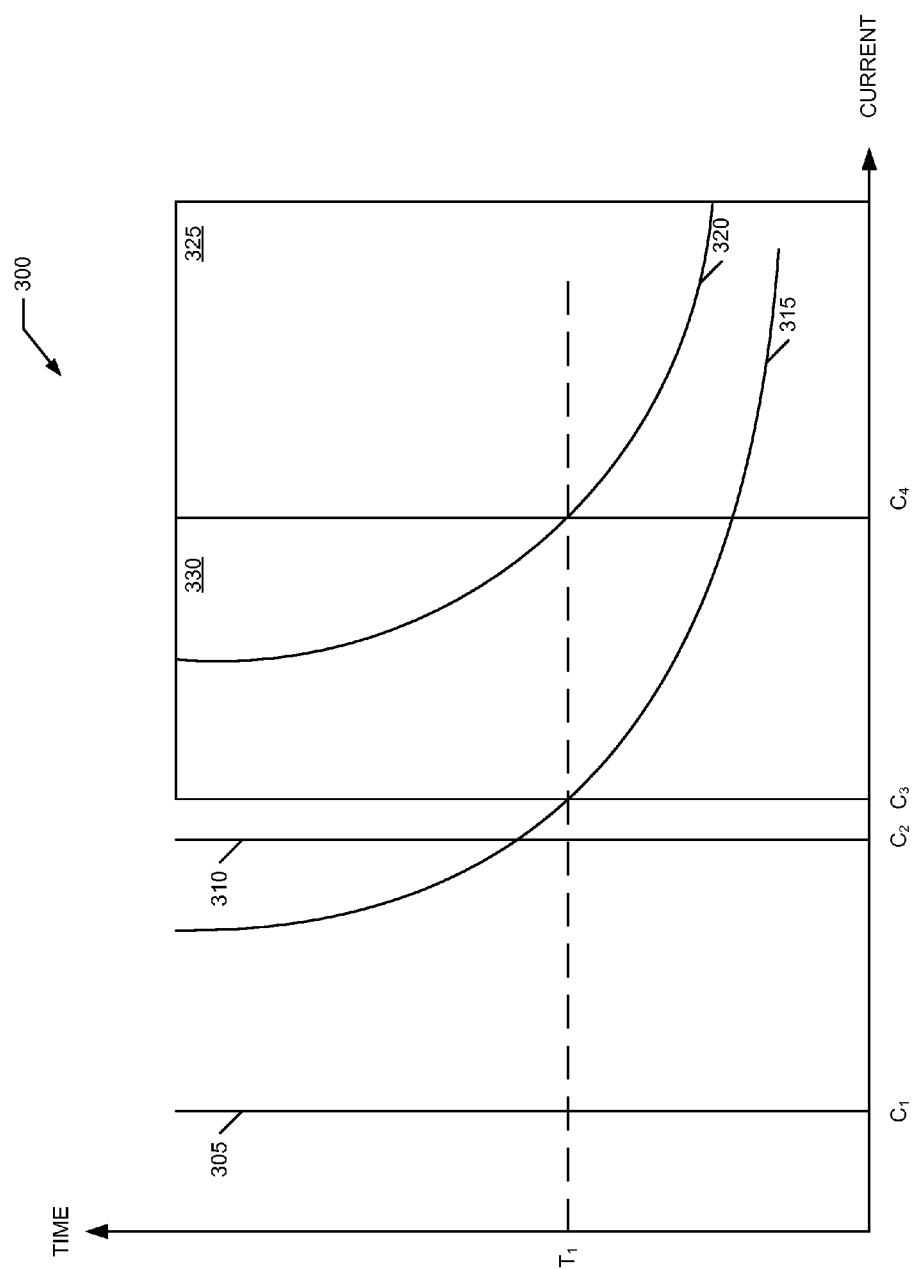
FIG. 3 illustrates a chart of current versus time for various modes of the active protection system shown in FIG. 1.

FIG. 3 illustrates a performance chart 300 of current versus time for various modes of the active protection system 100 shown in FIG. 1. Chart 300 includes a normal curve 305 and a peak curve 310. Normal curve 305 represents a current use for the normal operation mode (e.g., a nominal cruising current of C1) and peak curve 310 represents a current use for the peak operation mode (e.g., a nominal high acceleration current of C2). For these two modes N is set equal to 2 in the context of FIG. 2 and a number of parallel selective active protection 205 elements that are used.

Chart 300 includes a time T1 that represents a preselected duration for which an overcurrent may be present without triggering the overcurrent protection device. In FIG. 3, T1 represents 10 ms but other active protection 115 may implement a duration that varies from this value.

Chart A also includes an SAP_1 curve 315 and an SAP_1 +SAP_2 curve 320. SAP_1 curve 315 illustrates the overcurrent protection profile for selective active protection $205_1$ being solely active. SAP_1+SAP_2 curve 320 illustrates the overcurrent protection profile for selective active protection $205_1$ and selective active protection $205_2$ being active concurrently. A current C3 represents the current of SAP_1 curve 315 at time T1. A current C4 represents the current of SAP_1+ SAP_2 curve 320 at time T1.

A first region 325 illustrates those currents that are protected by active protection 115 when both (i.e., all) switches $210x$ have enabled their associated overcurrent protector 215. A second region 330 illustrates those currents that are protected by active protection 115 when SAP_1 $205_1$ is solely active (i.e., switch $210_1$ has enabled its associated overcurrent protector $215_2$ without switch $210_2$ has enabled its associated overcurrent protector $215_2$.) First region 325 by itself represents a conventional protection profile. The addition of second region 330 illustrates the additional protection afforded by an embodiment of the present invention.

Active protection 115 may be used to replace a standard fuse used in an EV battery pack. Each overcurrent protector $215_i$ could have a current rating significantly lower than the standard fuse. Some adjustment and evaluation will be necessary to set the preferred values of the individual current ratings. Parallel combinations of overcurrent protection are not expected to be directly additive of individual current ratings so setting particular levels will be dependent upon implementation and needs. During normal mode (~current C1), selective active protection $205_1$ is enabled and selective active protection $205_2$ is disabled and all of the energy transfer from energy storage system 105 flows through selective active protection $205_1$ (currents that are protected are those in both first region 325 and second region 330). Thus this mode offers protection across a greater range of potential short circuit currents while allowing the EV to operate under a lower load.

When the operator requests a higher acceleration that requires additional power (~current C2), both selective active protection $205_1$ and selective active protection $205_2$ are enabled and the energy transfer from energy storage system 105 flows through both selective active protection $205_1$ and selective active protection $205_2$ (currents that are protected are those in first region 325 only). This allows a higher level of current to be supplied while temporarily shrinking the range of protected currents.

When dynamically reconfiguring itself in response to an operational change from normal mode to peak mode, active protection 115 would not need to wait until switch $210_2$ is closed before allowing the pack to deliver the higher current as long as overcurrent protector $215_1$ is able to provide the increased current request without blowing for the short (~milliseconds) amount of time it takes to close switch $210_2$. When the higher current is no longer required, switch $210_2$ could be opened again, restoring the expanded range of current protection. When the car is off, both switches could be opened, offering great protection from short circuit by breaking the circuit internally. Both switches could also be opened in the event of an accident or other emergency, quickly breaking the circuit and inhibiting unintended discharges from energy storage system 105.

There are variations to the configuration described above. For example, switch $210_1$ could be removed to permanently connect energy storage element 105 to load 110 through first overcurrent protector $215_1$. Second overcurrent protector $215_2$ could then be added and subtracted as needed by properly controlling switch $210_2$. This configuration would eliminate any need for powering and cooling a switch $210_1$ that would be closed anytime the EV is driving. This configuration would also eliminate the use of breaking the circuit completely during emergency or while the EV is off.

As noted in FIG. 2, additional selective active protection $205i$, $i>2$ could be added. Doing so adds complexity, it would further expand the protected range and the amount of time such additional protection could be active.

The overcurrent protection elements do not need to be identical. For example, for current C1 nominally equal to 250 A and current C2 nominally equal to 1000 A, a 300 A fuse could be used as first overcurrent protector $2151$ and a 700 A fuse could be used for second overcurrent protector $2152$ (though in reality current ratings do not simply add and a more detailed examination of time-current curves would be required to choose the appropriate combination of fuses).

In some implementations, switch $210_2$ could be closed shortly before switch $210_1$ is opened. For N=2, this would force all of the current through second overcurrent protector $215_2$ rather than sharing the current between overcurrent protectors $215_x$.

The system and methods above has been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. An electric circuit implemented in an electric vehicle, the electric circuit comprising:
   an electric propulsion motor configured for propelling the electric vehicle;
   an energy storage system comprising cells, wherein a throttle control operated by a user causes either a normal current or a peak current to flow from the energy storage system to the electric propulsion motor, the peak current being transient relative to the normal current;
   a first selective active protection element in a first path from the energy storage system to the electric propulsion motor, the first selective active protection element comprising a first overcurrent protector connected in series with a first switch for selectively opening and closing the first path;
   a second selective active protection element in a second path from the energy storage system to the electric propulsion motor, the second selective active protection element comprising a second overcurrent protector connected in series with a second switch for selectively opening and closing the second path; and
   a control circuit for the first and second switches, the control circuit configured to receive input generated by the throttle control, wherein when the input corresponds to the normal current the first switch is closed and the second switch is open, so that the normal current flows through the first path, and wherein when the input corresponds to the peak current both the first and second switches are closed, so that the peak current flows through the first and second paths.

2. The electric circuit of claim 1, wherein (i) an amount of time until the peak current causes the first overcurrent protector to blow is longer than (ii) an amount of time it takes to close the second switch, and wherein upon the input corresponding to the peak current the electric vehicle does not wait for the second switch to be closed before allowing the peak current to flow from the energy storage system to the electric propulsion motor.

3. The electric circuit of claim 1, wherein in response to the electric vehicle being turned off, the control circuit opens both the first and second switches.

4. The electric circuit of claim 1, wherein in response to the electric vehicle being in an accident, the control circuit opens both the first and second switches.

5. The electric circuit of claim 1, wherein the first selective active protection element has a lower current rating than the second selective active protection element.

6. The electric circuit of claim 1, further comprising a protection element in a third path from the energy storage system to the electric propulsion motor that has no switch.

7. The electric circuit of claim 1, wherein the electric vehicle further comprises a cooling system configured to apply coolant to the first and second selective active protection elements.

8. The electric circuit of claim 1, wherein an operating current flowing from the energy storage system to the electric propulsion motor corresponds to the normal current when the operating current is in a first current range, and wherein the operating current corresponds to the peak current when the operating current is in a second current range higher than the first current range.

9. The electric circuit of claim 1, wherein said first and second selective active protection elements are integrated into the energy storage system.

10. The electric circuit of claim 1, wherein each of the first and second overcurrent protectors includes a fuse.

11. A method performed in an electric vehicle having an energy storage system and an electric propulsion motor, the method comprising:
   receiving an input generated by a throttle control in the electric vehicle;
   transferring, in response to the received input, a normal current or a peak current from the energy storage system to the electric propulsion motor, wherein a first selective active protection element in a first path from the energy storage system to the electric propulsion motor comprises a first overcurrent protector connected in series with a first switch for selectively opening and closing the first path, and wherein a second selective active protection element in a second path from the energy storage system to the electric propulsion motor comprises a second overcurrent protector connected in series with a second switch for selectively opening and closing the second path;
   in response to the input corresponding to the normal current, causing the first switch to be closed and the second switch to be open, so that the normal current flows through the first path; and
   in response to the input corresponding to the peak current, causing both the first and second switches to be closed, so that the peak current flows through the first and second paths.

12. The method of claim 11, further comprising, in response to the electric vehicle being turned off, causing both the first and second switches to be open.

13. The method of claim 11, further comprising, in response to the electric vehicle being in an accident, causing both the first and second switches to be open.

14. The method of claim 11, further comprising applying coolant from a cooling system of the electric vehicle to the first and second selective active protection elements.

* * * * *